United States Patent [19]

Nickols, Jr. et al.

[11] 4,297,419
[45] Oct. 27, 1981

[54] ANODE-MATRIX COMPOSITE FOR MOLTEN CARBONATE FUEL CELL

[75] Inventors: Richard C. Nickols, Jr.; John C. Trocciola, both of Glastonbury, Conn.; James E. Rourke, East Windsor, N.J.

[73] Assignee: United Technologies Corporation, Hartford, Conn.

[21] Appl. No.: 189,888

[22] Filed: Sep. 24, 1980

[51] Int. Cl.³ .............................................. H01M 4/86
[52] U.S. Cl. .......................................... 429/44; 429/46
[58] Field of Search ............................. 429/44, 45, 46

[56] References Cited

U.S. PATENT DOCUMENTS

| | | | |
|---|---|---|---|
| 3,347,668 | 10/1967 | Clark et al. | 75/201 |
| 3,377,203 | 4/1968 | Mobius et al. | 136/86 |
| 3,466,197 | 9/1969 | Bawa | 136/86 |
| 3,615,839 | 10/1971 | Thompson et al. | 136/86 |
| 3,615,862 | 10/1971 | Roth et al. | 136/120 |
| 3,622,394 | 11/1971 | Bawa et al. | 136/153 |
| 3,658,597 | 4/1972 | Gray | 136/148 |
| 3,998,939 | 12/1976 | Mason et al. | 423/600 |
| 4,041,210 | 8/1977 | Van Dine | 429/16 |
| 4,079,171 | 3/1978 | Marianowski et al. | 429/46 |
| 4,080,487 | 3/1978 | Reiser | 429/16 |
| 4,115,628 | 9/1978 | Bonnemay et al. | 429/44 |

FOREIGN PATENT DOCUMENTS 893853  2/1972  Canada .

OTHER PUBLICATIONS

Broers, G. H. J., *High Temperature Galvanic Fuel Cells,* Academisch Proefschrift (1958).
Institute of Gas Technology, "Development of Molten Carbonate Fuel Cells", A.G.A. *Project DC-4-1,* Final Report, Chicago, 1967.
Broers, G. H. J. and Van Ballegoy, H. J. J., "Phase Equilibria in Li–Na–K Carbonate/Aluminate Systems", Paper presented at the 3rd International Symposium on Fuel Cells, Brussels, Jun. 1969.
Aubry, J. and Klein, D., "Etude de l'aluminate de lithium", *Chim. Ind. Genie Chim.* 103, (13) 1643–1644 (1970).
Huynink, H. E., "Cell Assemblies for a Molten Carbonate Fuel Battery, II, Electrolyte Plate Discs for Molten Carbonate Fuel Cells", *Energy Convers.* 12, 139–143 (1972).

*Primary Examiner*—Charles F. Lefevour
*Attorney, Agent, or Firm*—Harry J. Gwinnel

[57] ABSTRACT

A molten carbonate fuel cell anode-matrix composite and a molten carbonate fuel cell including such composite are described. The anode-matrix material comprises carbonate electrolyte in intimate combination with ceria anode-matrix material. The anode-matrix material shows substantially no phase change or reaction with the electrolyte after at least 2000 hours under molten carbonate fuel cell operating conditions.

10 Claims, 3 Drawing Figures

1

ANODE-MATRIX COMPOSITE FOR MOLTEN CARBONATE FUEL CELL

CROSS REFERENCE TO RELATED APPLICATIONS

Commonly assigned, copending application Ser. No. 189,886, filed Sept. 24, 1980 is directed to ceria matrix material for molten carbonate fuel cells; and commonly assigned, copending application Ser. No. 189,887, filed Sept. 24, 1980 is directed to a molten carbonate fuel cell anode.

DESCRIPTION

Technical Field

The field of art to which this invention pertains is molten carbonate fuel cells and more particularly anode-matrix material for molten carbonate fuel cells.

Background Art

Fuel cells which use alkali-metal carbonates as the electrolyte are well known in the art and are generally referred to as molten carbonate fuel cells since the electrolyte is liquid at typical operating temperatures in the range of 550° C.–750° C. (1022° F.–1382° F.). The electrolyte is usually mixed with an inert particulate or fibrous material which remains solid during cell operation and maintains the space between the cathode and anode portions of the cell and prevents the mixing of the two reactants. The combination of electrolyte and inert material is referred to as a tile when in the solid state at room temperature. Most molten carbonate fuel cell electrolytes are ternary or binary mixtures of, for example, lithium carbonate, potassium carbonate, and sodium carbonate. Molten carbonate fuel cell systems in general are described in commonly owned U.S. Pat. Nos. 3,615,839; 4,041,210; and 4,080,487.

Because of the highly corrosive environment which exists in fuel cells in general, there is an on-going search for stable electrolyte-matrix material and anode material which can withstand the rigors of such use. For example, Canadian Pat. No. 893,853 and U.S. Pat. No. 3,377,203 discuss the advantages of various metal oxides in corrosive fuel cell environments and particularly refer to ceria in potassium hydroxide electrolyte solutions and solid electrolyte solutions such as zirconia, calcium oxide, and alumina. Similarly, U.S. Pat. No. 3,622,394 teaches the advantages of using magnesium oxide, magnesium aluminate, and lithium aluminate as matrix material.

While it is known in the art, as evidenced by the Canadian reference that such things as zirconium oxide, thorium oxide, cerium oxide, and aluminum oxide have good corrosion stability, there is no way to predict from this that any particular metal oxide would have exceptional or even acceptable performance in a molten carbonate fuel cell environment. For example, zirconium oxide is well known to be stable in potassium hydroxide. However, its use is unacceptable in a molten carbonate fuel cell. See the Institute of Gas Technology article, "Development of Molten Carbonate Fuel Cells", A.G.A. *Project DC*-4-1 Final Report, Chicago, 1967; and the Huynink, H. E. article, "Cell Assemblies for a Molten Carbonate Fuel Battery. II. Electrolyte Plate Discs for Molten Carbonate Fuel Cells", *Energy Convers.* 12, 139–143 (1972).

An article by Broers (*High Temperature Galvanic Fuel Cells,* Broers, G. H. I.) discusses the use of $CeO_2$ in a fuel cell but recognizes no superiority as compared to other materials such as MgO in this environment, and in fact, references some dissolution of the $CeO_2$. And the MgO which is reported to be stable in alkaline carbonate systems, in fact demonstrates such problems as matrix cracking, structural degradation and reactivity with the electrolyte in a molten carbonate system. See the Broers, G. H. J. and Van Ballegoy, H. J. J. article entitled "Phase Equilibria in Li-Na-K Carbonate/Aluminate Systems", Paper presented at the 3rd International Symposium on Fuel Cells, Brussels, June 1969; Aubry, J. and Klein, F. article entitled "Etude de l'aluminate de lithium", *Chim. Ind. Genie Chim.* 103 (13), 1643–1644 (1970); and Huynink, H. E. article entitled "Cell Assemblies for a Molten Carbonate Fuel Battery. II. Electrolyte Plate Discs for Molten Carbonate Fuel Cells", Energy Convers. 12, 139–143 (1972). And while the conductivity of ceria has been recognized, this was in conjunction with its use as an electrolyte material and not as either a matrix or anode material. (Tuller et al, "Doped Ceria as a Solid Oxide Electrolyte", *J. Electrochem. Soc.,* vol. 122, No. 2, pps 255–259, 1975).

A popular conventional molten carbonate electrolyte-matrix material currently in use is high purity lithium aluminate. Note U.S. Pat. No. 3,622,394 and No. 4,079,171. However, such material is not stable with long term use. Note FIG. 1 which shows the significant phase change in crystal structure which occurs after about 1800 hours in a molten carbonate fuel cell operating environment.

Phase change in crystalline structure or a chemical reaction with the electrolyte is intolerable for an electrolyte-matrix material in a fuel cell. A change in the crystallite size of the particles affects the pore size of the matrix. Either particle growth or particle size shrinkage without compaction will produce large pore sizes in the matrix which will result in electrolyte expulsion to the porous fuel cell electrodes. This results in gas crossover which enables the gases to chemically react in an uncontrolled manner obviating the liberation and use of electrons from such reactions to produce the current. Similarly, if the filler or matrix chemically reacts with the electrolyte, there is a corresponding depletion of the electrolyte in the cell and matrix. Either case would result in a loss of efficiency of the cell and a reduction in power generation evidenced by a fall-off in the amps produced at a given potential. This same sequence can occur with crystal conversion when the new crystalline form is larger. If the new crystalline form is larger, proportionally too much filler will be present between the electrodes causing electrolyte expulsion into the electrodes and carbonate flooding of the electrodes by filling of the pores on the electrodes, thereby preventing the gaseous reactants from getting to the electrode reaction sites.

Though great strides have been made in the discovery of various matrix material for use in corrosive fuel cell environments, there is much room for improvement in matrix material for the long term use desired in this art. Furthermore, it is important to keep in mind that molten carbonate electrolytes provide a completely different type of chemical, thermal and corrosive environment than any other type of fuel cell environment. In particular, the reactions being catalyzed and the corrosive environment produced under molten carbonate fuel cell operating conditions are totally different than produced in other fuel cell environments.

Problems similar to those encountered with the electrolyte-matrix material exists with molten carbonate anode material as well. For example, when conventionally used nickel based material (note U.S. Pat. No. 3,347,668, No. 3,615,862 and No. 4,115,628) is used as the anode material in molten carbonate fuel cells, various problems occur. For example, the nickel anode which is required to be porous, consolidates with use closing the pores and causing countless problems. This consolidation occurs because of the reducing atmosphere, compressive load, and high temperatures utilized with the molten carbonate fuel cell process. Furthermore, a stack of these nickel anodes in the cell bundle gets thinner and thinner with use, resulting in pore closure causing gaps in the stack with resulting lapses in electronic and ionic communication through the stacks.

Accordingly, there is a need in this act for increased stability and longevity in both molten carbonate anode and electrolyte-matrix material.

DISCLOSURE OF INVENTION

This invention is directed to a molten carbonate fuel cell anode-matrix composite comprising a cerium oxide substrate having adjacent sections of greater and lesser pore sizes, the substrate sections being impregnated with carbonate electrolyte. The section of the substrate having the greater pore size is electron conductive and anode catalytic under molten carbonate fuel cell operating conditions. The section of the substrate having the lesser pore size is substantially non-catalytic and non-electron conductive under molten carbonate fuel cell operating conditions.

Another aspect of the invention is a molten carbonate fuel cell incorporating such anode-matrix composite material.

The foregoing, and other features and advantages of the present invention, will become more apparent from the following description and accompanying drawing.

BEST MODE FOR CARRYING OUT THE INVENTION

Figure 2:
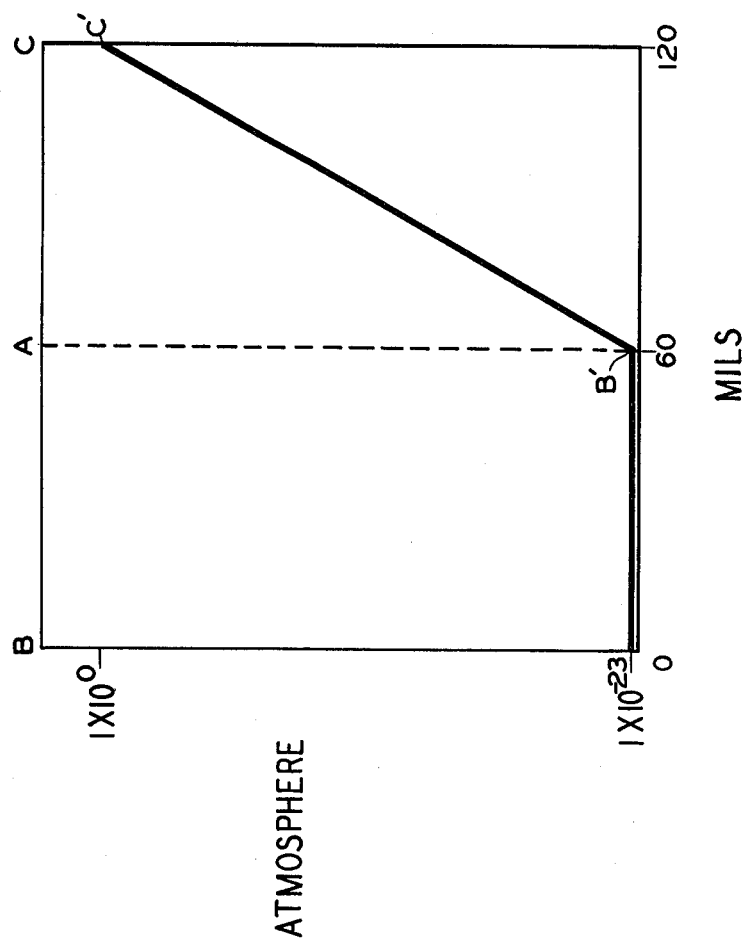
FIG. 2 shows the difference in partial pressure through the anode-matrix structure.

Ceria under a reducing atmosphere such as would be experienced at the anode portion of the cell is highly conductive. Acting as a highly conductive material, the ceria is very useful as an anode. FIG. 2 demonstrates the difference in oxygen partial pressure which takes place passing through the cell and at the higher oxygen pressure at the cathode side of the cell, the ceria would be non-electron conducting. An exemplary oxygen partial pressure on the anode side of the cell would be approximately $1 \times 10^{-21}$ to $1 \times 10^{-23}$ atmosphere and on the cathode side of the cell would be $1 \times 10^0$ atmosphere. The anode-matrix material of the cell would basically be divided into two portions having different pore sizes. The anode portion from point A to point B would be of a larger pore size and therefore, contain more pores unfilled with electrolyte allowing for a greater hydrogen pressure (and therefore, a lower oxygen pressure) and allowing the ceria to be conductive. That portion from point A to point C would be of a small pore size and contain more pores filled with electrolyte and therefore allow for a lower hydrogen pressure and accordingly, the ceria would be non-electron conducting and act as a matrix material. Conventional cathode material such as nickel oxide or conductive perovskites would lie in juxtaposition to side C and operate as a conventional cathode in this environment. That portion of the anode-matrix composite experiencing the greater hydrogen partial pressure will be anode catalytic and electron conducting, i.e. insofar as promoting the anode reaction.

Unless provided for in the anode-matrix composite, the mere elimination of the anode will not permit a molten carbonate fuel cell to operate. Because the matrix would not be electronically conductive or promote the anode reaction, the composite has to be specifically designed to have such properties.

As stated above, with the three component systems which represent that state of the art (anode-matrix cathode) the anode material is prone to mechanical and structural problems which can become the life limiting component of the cell. The ceria anode-matrix composite offers great potential in preventing such things as anode creep, sintering, and cost problems associated with such a life limiting component.

In operation, the determinative factor as to which point through the composite (note FIG. 2) the ceria is no longer anode reactive will be determined by the partial pressure of the gases on both sides of the cell electrodes. This in turn will be determined by the pore sizes in the matrix and anode portions of the composite. Exemplary pore sizes for the various portions of the anode-matrix are at least approximately 1 micron in diameter (e.g. $2\mu$ to $10\mu$) for the anode portion and less than approximately 1 micron in diameter (e.g. $0.01\mu$ to $1\mu$) for the matrix portion. The important factor to be noted is the difference in the pore sizes between the anode and matrix portions of the composite. While there will be some electrolyte in the anode portion of the porous ceria component, there will not be as much as in the matrix portion of the component and certainly not so much so as to interfere with the gas flow to the catalytic anode surface.

FIG. 2 is a graph of the oxygen partial pressure through an exemplary composite anode-matrix according to the present invention. Line C represents that side of the matrix portion of the composite in contact with the cathode. Line B represents the outer edge of the anode portion of the composite. Line A represents that portion of the composite where the anode catalytic activity either falls off or begins and conversely the matrix function either falls off or begins, i.e. the anode-matrix boundary. The partial pressure at point C' will typically be in the order of $1 \times 10^0$ atmosphere. The oxygen partial pressure at B' will typically be in the order of $1 \times 10^{-21}$ to $1 \times 10^{-23}$ atmosphere. While it is not specifically known that the oxygen partial pressure passing through the composite from line C to B' experiences linear decrease, i.e. from the cathode side of the composite to the anode side of the composite, it can be logically assumed that such substantial linear decrease takes place.

Figure 3:
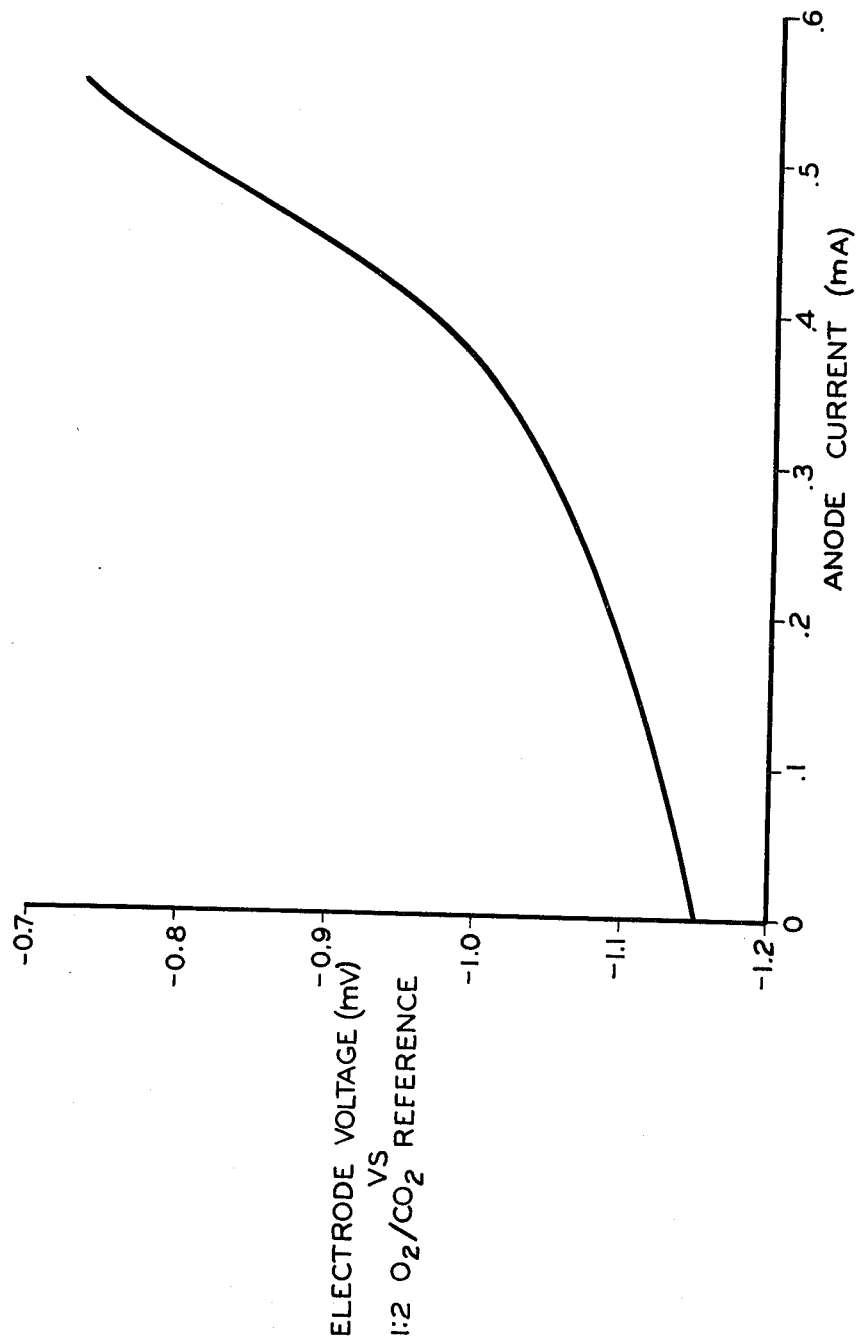
FIG. 3 demonstrates the ability of ceria to function as an anode material in a molten carbonate fuel cell.

FIG. 3 demonstrates the ability of the ceria to function as an anode for hydrogen in molten carbonate systems. In this Fig., electrode voltages (in millivolts vs. a 1:2 $O_2/CO_2$ reference electrode) is plotted as a function of anode current (in milliamps). The electrolyte utilized for the test was a binary eutectice mixture of lithium carbonate and potassium carbonate. The fuel gas utilized was a mixture of (percents by volume) 92.5% $H_2$, 2% $CO_2$, 5.5% CO saturated at 127° F. with water. As can be seen from the graph, the ceria has definite anode catalytic activity in promoting the oxidation of hydrogen.

A variety of methods may be utilized to make the electrolyte-matrix according to the present invention. The preferred method comprises coating either a preferred ceria anode or the cathode or both on one side with a solution of the ceria admixed with a temporary binder, such as gum arabic, cellulose acetate or polyvinyl butyral, followed by heating to remove the solvent carrier and binder. If the above binders are used, the heating can take place once the coated electrodes are mounted in the cell. In addition, the electrolyte can provide part of the admixture resulting in an electrolyte-matrix-binder coating, or the electrodes may be soaked in the electrolyte and the electrolyte allowed to infiltrate the matrix during cell heat-up.

Other methods which may be used to form the electrolyte-matrix of the present invention comprise compression molding ceria particles in combination or admixture with the electrolyte; or using the ceria alone by either dry-pressing, tape forming or slip casting using a temporary binder, or by sintering the ceria to form a porous substrate which is subsequently impregnated with the electrolyte in either solution or molten form. While tiles made according to such methods can be of size depending on fuel cell design, the tiles made and tested were typically made in four-inch squares with a thickness of approximately 50-70 mils.

While conventional binder material known in the art can be used in the fabrication of the ceria matrix, it is preferred to use a binder which can be removed by heating after the cell is constructed. Binders such as described above, or the carbonate electrolyte itself are particularly suitable for such a process. It should also be noted that it is not necessary for the ceria particles to be permanently bonded. For example, the ceria and electrolyte can simply be admixed in dry particulate form and poured or otherwise inserted between the electrodes. As stated, the electrolyte can be in dry particulate form as an admixture with the ceria particles or the ceria particles can be inserted unmixed between the electrodes and the carbonate electrolyte added separately. In such a case, the electrolyte can be added in molten form or as described above the electrodes can be pre-filled with electrolyte and the electrolyte allowed to soak into the matrix during cell heat-up.

The ceria used according to the present invention is preferably of the highest grade available, e.g. 99% by weight pure or better. However, a lower grade, such as 90%-95% purity ceria can also be used. Tolerable impurities comprise such things as other rare earth oxides, such as $Y_2O_3$, etc. Use of the term "ceria" throughout the specification and claims is meant to include the well-known $CeO_2$ form as well as reduced forms such as $Ce_2O_3$ or $CeO_{2-x}$ wherein x can vary between 0 and 0.5. The ceria matrix material is preferably used in the electrolyte matrix in about 20 to about 70% by volume with the remainder being electrolyte.

The preferred molten carbonate electrolyte comprises a eutectic mixture of lithium carbonate and potassium carbonate. However, any molten carbonate electrolyte system may be used such as, but not limited to, alkali metal or alkali earth carbonates, conventional lithium carbonate, potassium carbonate, sodium carbonate or combinations thereof.

Figure 1:
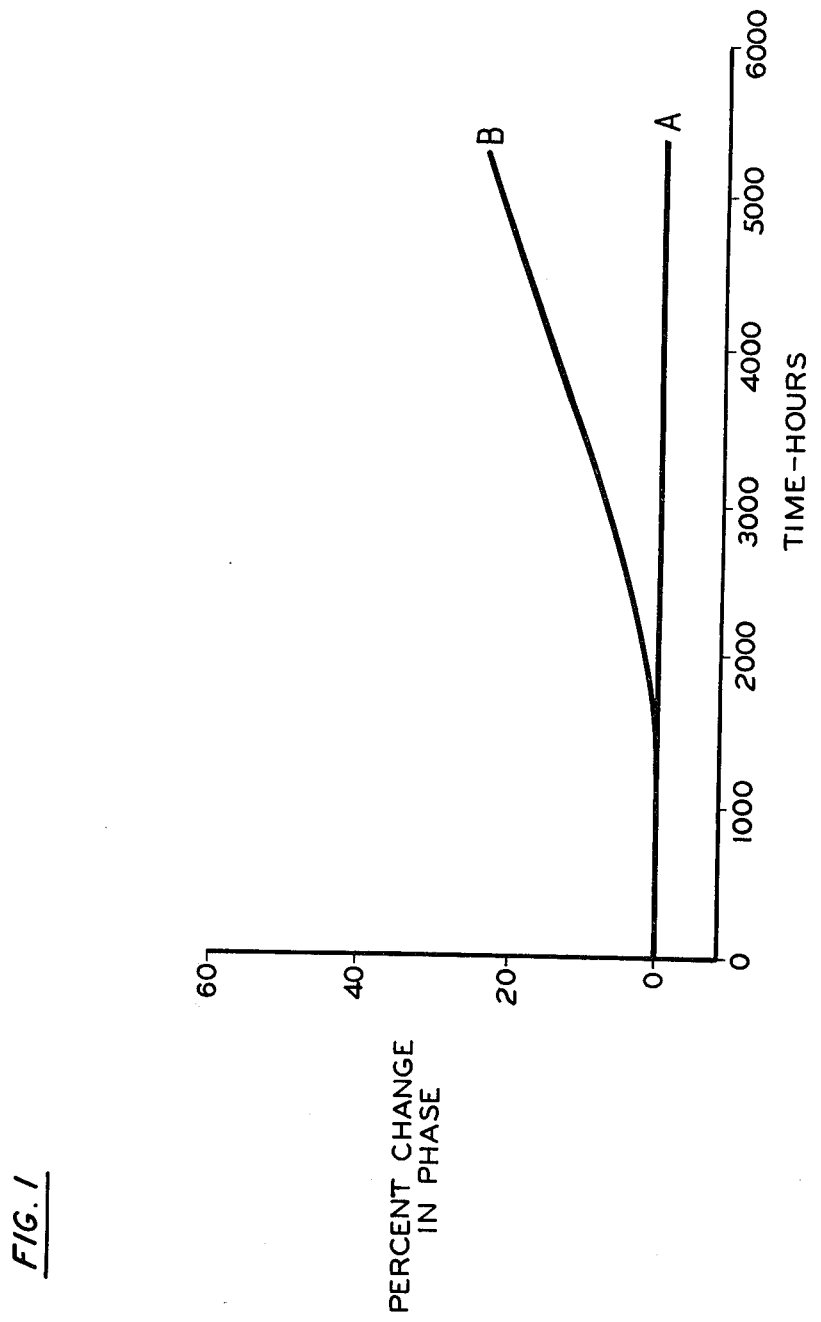
FIG. 1 shows the deterioration of conventional electrolyte-matrix material with long term use.

Stability of the electrolyte matrix material of the present invention was measured in tests which allowed the maximum available carbonate electrolyte to contact the ceria particles. The ceria particles were immersed and surrounded by molten carbonate electrolyte heated to at least 1200° F. In one case the fuel gas environment was simulated by allowing a mixture comprising approximately 51% $H_2$, 10% $CO_2$, 10% CO and 29% $H_2O$, all percents by volume, to pass over the ceria-carbonate on a continuing basis. In other tests the oxidant environment was simulated by utilizing a $CO_2$ gas at temperatures up to 1400° F. in the same manner. These tests not only simulate the fuel cell environment, but simulate this environment with maximum ceria exposure to the carbonate. The carbonate electrolyte used was a preferred binary eutectic mixture of 62% by volume lithium carbonate and 38% by volume potassium carbonate. As evidenced by FIG. 1 showing the fuel gas environment testing described above, where curve A is the ceria matrix material and B conventional high purity $\gamma LiAlO_2$ matrix material, not only was there no sign of corrosion, crystalline phase change, or reactivity of the ceria with the molten carbonate after 2000 hours of testing, but no signs of instability were evident even after more than 5000 hours of testing. The $LiAlO_2$, however, began to show significant crystalline phase change after 1800 hours. The ceria remained in its original cubic phase with substantially no change in mechanical strength or weight loss during the test duration. The lithium aluminate tested as described above at 1375° F. under $CO_2$ gas flow showed essentially 100% crystalline phase change after only 1100 hours. The ceria tested under the same conditions (1375° F., $CO_2$ gas flow) showed no crystalline phase change after 2000 hours of testing.

It is quite unexpected that the ceria performs in such manner in the molten carbonate environment since as stated above, other ceramics such as zirconium oxide and potassium titanate which are compatible (as is ceria) with molten KOH under KOH fuel cell operating conditions are incompatible with molten carbonate under molten carbonate fuel cell operating conditions. For example, zirconia under the same test conditions recited above for ceria, reacts with at least one of the carbonate electrolytes according to the following equation:

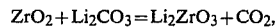

$$ZrO_2 + Li_2CO_3 = Li_2ZrO_3 + CO_2,$$

with a corresponding change in volume. Furthermore, ceria being the first element of the rare earths in the Periodic Table, is similar to 15 other elements in this series. Yet, lanthanum oxide, which is the nearest neighbor to ceria in the rare earth series, is not compatible with molten carbonate under fuel cell operating conditions. Test results show that lanthanum oxide forms lanthanum carbonate very quickly, e.g. after 390 hours at 1400° F. under $CO_2$ gas flow in the presence of carbonate as described above. Therefore, it might be expected that ceria would also react in the same way. However, as evidenced above, not only does ceria not react in such a way, but the ceria is far superior to any known anode or matrix material in this environment.

Although this invention has been shown and described with respect to detailed embodiments thereof, it will be understood by those skilled in the art that various changes in form and detail thereof may be made without departing from the spirit and scope of the claimed invention.

We claim:

1. A molten carbonate fuel cell anode-matrix composite comprising an alkali metal carbonate impregnated cerium oxide substrate having adjacent sections of greater and lesser pore sizes, the section of greater pore size being electron conductive and anode catalytic under molten carbonate fuel cell operating conditions, and the section of lesser pore size being substantially non-catalytic and non-electron-conductive under molten carbonate fuel cell operating conditions.

2. The composite of claim 1 wherein the anode-matrix composite undergoes substantially no crystalline phase change or reaction with the electrolyte for at least 2000 hours under molten carbonate fuel cell operating conditions.

3. The composite of claim 2 wherein the ceria is present in an amount of about 20% to about 70% by volume.

4. The composite of claim 2 wherein the carbonate electrolyte comprises lithium carbonate, potassium carbonate, sodium carbonate or mixtures thereof.

5. The composite of claim 1 wherein the greater pore size is at least $1\mu$ in diameter and the lesser pore size is less than $1\mu$ in diameter.

6. A molten carbonate fuel cell comprising an anode matrix composite comprising an alkali metal carbonate impregnated cerium oxide substrate having adjacent sections of greater and lesser pore sizes, the section of greater pore size being electron conductive and anode catalytic under molten carbonate fuel cell operating conditions and the section of lesser porosity being substantially non-catalytic and non-conductive under molten carbonate fuel cell operating conditions, and a cathode electrode in contact with the anode-matrix composite on the matrix side of the composite.

7. The fuel cell of claim 6 wherein the anode-matrix undergoes substantially no crystalline phase change or reaction with electrolyte for at least 2000 hours of molten carbonate fuel cell operating conditions.

8. The fuel cell of claim 6 wherein the composite comprises about 20% to about 70% by volume ceria.

9. The fuel cell of claim 6 wherein the carbonate electrolyte comprises lithium carbonate, potassium carbonate, sodium carbonate or mixtures thereof.

10. The fuel cell of claim 6 wherein the greater pore size is at least $1\mu$ in diameter and the lesser pore size is less than $1\mu$ in diameter.

* * * * *